United States Patent
Astely (10) Patent No.: US 8,483,145 B2
(45) Date of Patent: Jul. 9, 2013

(54) METHOD FOR CHANNEL QUALITY MEASURES IN A MULTIPLE ANTENNA SYSTEM

(75) Inventor: David Astely, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1239 days.

(21) Appl. No.: 12/305,128

(22) PCT Filed: Jun. 16, 2006

(86) PCT No.: PCT/SE2006/050205
§ 371 (c)(1), (2), (4) Date: Dec. 16, 2008

(87) PCT Pub. No.: WO2007/145556
PCT Pub. Date: Dec. 21, 2007

(65) Prior Publication Data
US 2009/0274074 A1    Nov. 5, 2009

(51) Int. Cl.
*H04W 4/00* (2009.01)

(52) U.S. Cl.
USPC .......................................... 370/329; 455/69

(58) Field of Classification Search
None
See application file for complete search history.

(56) References Cited

U.S. PATENT DOCUMENTS

| | | | |
|---|---|---|---|
| 6,760,388 B2 * | 7/2004 | Ketchum et al. | 375/295 |
| 6,873,606 B2 * | 3/2005 | Agrawal et al. | 370/310 |
| 7,151,809 B2 * | 12/2006 | Ketchum et al. | 375/347 |
| 7,194,042 B2 * | 3/2007 | Walton et al. | 375/267 |
| 7,197,084 B2 * | 3/2007 | Ketchum et al. | 375/296 |
| 7,508,891 B2 * | 3/2009 | Jung et al. | 375/347 |
| 7,688,789 B2 * | 3/2010 | Pan et al. | 370/334 |
| 2003/0185309 A1 * | 10/2003 | Pautler et al. | 375/257 |
| 2007/0253476 A1 * | 11/2007 | Tirkkonen et al. | 375/230 |

* cited by examiner

*Primary Examiner* — Brian Roberts (57) ABSTRACT

The present disclosure relates to method for link adaptation in a first network unit of a wireless communication system. The first network unit comprises one or multiple antennas adapted for data transmission to and data reception from at least one second network unit in said system. The method adapts, in response to interference experienced at the site of the first network unit, transmission parameters for data transmissions from said second network unit to said first network unit. The method comprises determining values equivalent to the Hermitian inner products between whitened vector channels associated with the individual combinations of antennas of said second network unit transmitting to said first network unit. The method further comprises steps of mapping the determined values into a data element and providing the data element as feedback information to said second network unit.

30 Claims, 3 Drawing Sheets

METHOD FOR CHANNEL QUALITY MEASURES IN A MULTIPLE ANTENNA SYSTEM

TECHNICAL FIELD

The present invention relates to methods and arrangements in wireless communication systems, in particular to channel quality measures for link adaptation with one or multiple antennas at either side of a link in the presence of interference and noise.

BACKGROUND

The use of multiple antennas at base stations and in terminals has gained at lot of interest in the industry as well as in standardization bodies and in international research projects. Multiple antenna techniques are currently believed to be a key technology in the (long-term) evolution of existing wireless systems and in the development of future systems. At the same time, efficient resource management in terms of multi-user scheduling and link adaptation as well as so called cross-layer optimization with the physical layer are likewise challenging, promising, and important areas.

From a multi-user resource allocation and link adaptation perspective it appears to be a key component to achieve a measure that can be used to predict the performance of different allocations with respect time-frequency-code resources, modulation, code rate and transport block length as well as different spatial configurations such as transmit weights and linear dispersion codes. An algorithm will then evaluate performance, e.g. in terms of the average expected throughput or probability of successful transmission, for different schemes and allocations and select an allocation in terms of users and corresponding modes that meets the desired targets such as, e.g., maximum throughput for non delay sensitive services or negligible error probability for a re-transmission associated with a delay sensitive service.

Performance prediction is also of interest from a system performance point-of-view. Performance models based on mapping a scalar single antenna/stream SINR to mutual information and averaging in the information domain has been considered.

Efficient resource management thus requires reasonable performance prediction and for this purpose it may be realized that adequate measurements of channel and interference conditions are required. As of today, e.g. in an evolved 3G system, a scalar valued channel quality indicator (CQI) in terms of an SINR after receiver processing or the corresponding preferred transport format which corresponds to a data rate is typically used.

Linear receive and transmit schemes, such as beam forming and linear dispersion codes with linear receivers may in principle be incorporated by adjusting the SINR calculation, but then the measurements become specific for the by the terminal assumed spatial transmit and receive processing. Thus, the terminal may determine suitable transmit weights or a selection of transmit antennas and evaluate the performance for this choice only. It is then, however, not trivial for the transmitter to evaluate a selection of a different transmit scheme which may be required when considering multi-user, multi-cell, multi-system aspects. Also, it is not obvious how to incorporate non-linear demodulation schemes, such as (approximate) maximum likelihood demodulations.

SUMMARY

For an efficient exploitation of the advantages offered by a multiple antenna transmission system it is beneficial to have adequate measurements for scheduling and link adaptation. In the single antenna case the signal-to-interference-and-noise ratio (SINR)—or a suitable measure deduced from it, such as a data rate—is sufficient information for link adaptation. However, with multiple antennas it is not obvious what information to be measured, processed, and sent back as feedback information to a transmitting unit, i.e. how to create a generalization of the information that corresponds to the SINR-value in the single antenna case.

Thus, a good knowledge of not only the propagation channels but also interference is of great importance. Therefore, it is an object of the present invention to provide an adequate and appropriately sufficient, condensed measure that describes as complete as possible the channels and interference conditions, independently of the transceiver techniques, from which adequate decisions and measures for link adaptation and scheduling can be made available to a transmitting unit.

Basically, the present invention provides methods and arrangements for forming a data element comprising values that are equivalent to the Hermitian inner products between whitened vector channels associated with the individual combinations of antennas of one or more transmitting units or comprising a processed representation of said values. When arranging the SINR-values in form of a matrix, this matrix is of a Hermitian type with size $M_T \times M_T$ with $M_T^2$ real degrees of freedom and containing the inner products between whitened vector-valued channels associated with all transmit antennas. Said values consist of SINR-values of the transmitter antennas in addition to orthogonality measures between pairs of the transmitter antennas. This data element can then advantageously be used for link adaptation and/or scheduling in the sense that optimization and selection of users and (spatial) transmit parameters can be done with it. The data element is both CSI and CQI and essentially independent of the transceiver technique.

The present invention relates to a first embodiment where the receiving unit provides said values or functions thereof as feedback information in form of a data element to units transmitting to said receiving unit and relates to a second embodiment where the receiving unit provides a processed signal sequence from which transmitting units can deduce said values.

It is an advantage of the present invention to combine and, to some extent, compress channel and interference measurements for multiple antenna scenarios into a measure that can be used for adaptation with a large number of different techniques. This technique-independent measure encompasses both what is commonly referred to as channel quality information (CQI) and channel state information (CSI) and also coincides an SINR-value in the case of only a single transmit antenna. Thus, the present invention provides a systematic way to extend measurements for fast scheduling and link adaptation to the multiple antenna case. It should be noted that the single antenna case is a special case of the multiple antenna case.

Another advantage is, if the full measure is made available to the transmitter in form of an data element, that the present invention provides sufficient feedback in the sense that the transmitter can predict the performance for almost any transmit scheme with arbitrary parameters and not only the scheme which the terminal found most suitable by considering only the single link.

It is still another advantage of the present invention that processor intense optimizations and adaptations can be performed in the access point instead of in the mobile terminal. In case of so called SDMA, i.e. simultaneous transmission to several users at the same time, it can be seen that the data elements of a set of users contains the required measure of "spatial orthogonality" to perform also multi-user optimization and adaptation.

Also for the case with all processing and optimization done in the terminal, it is beneficial to base measurement reports on a common well defined and sensible measure such as the proposed data element. As is well known, a measurement is much more valuable if one knows what it represents, what it is based on, and how it was determined.

Finally, since the measure appears to be useful for a very large number of different techniques, a system concept design/standardization can in principle separate, e.g., the MIMO methods from the procedures for the measurements. Thus, having agreed on a measurement/feedback scheme in terms of suitable functions of the matrix valued SINR, one can advantageously identify feasible MIMO techniques.

Other objects, advantages and novel features of the invention will become apparent from the following detailed description of the invention when considered in conjunction with the accompanying drawings and claims.

DETAILED DESCRIPTION

The following detailed description refers to the data element according to the present invention composed of a matrix-valued SINR or a processed representation of these values. However, although easily comprehensible in many aspects, this format shall only be regarded as one possible alternative to present the information for further processing, which does not exclude other possible forms of presentation.

The following description bases on a data model that considers as a conceivable communication system within which the present invention can be applied an OFDM (Orthogonal Frequency Division Multiplex)-based system in which the time-frequency resources are divided into resource blocks. The size of the resource blocks is typically such that variations of the channel within a block can be neglected. It is further assumed that channel estimates of the MIMO channel of each resource block are available as well as an estimate of the covariance of the noise and interference.

Channel estimates may be determined, e.g., by transmission of embedded pilot symbols together with an appropriate smoothing in the time and frequency domain. Estimates of the noise and interference covariance matrix may be formed, e.g., by using appropriate smoothing of the residuals that have been obtained after subtracting the estimates of the transmitted pilots. Thus, it is assumed that the samples associated with subcarrier k and OFDM symbol period n within a resource block may be well-modeled as $$y(k,n)=Hx(k,n)+e(k,n).$$

Here, y(n,k) is an $M_R \times 1$ column that models the received signal; x(k,n) is an $M_T \times 1$ column vector that models the transmitted signals. For the case with pure spatial pre-coding the transmit covariance that corresponds to the transmit power is written as $$E\{x(k,n)x^H(k,n)\}=WW^H.$$

W denotes the transmit weights; the model thus includes both so called open loop schemes, for which W is a scaled identify matrix representing the case of uniform spatial allocation of power, as well as schemes such as beamforming, selective versions of per antenna rate control (PARC), and various closed loop schemes based on SVDs of instantaneous channel matrices. Thus, transmitted signals are assumed normalized and denoted s(n,k) so that x(k,n)=Ws(n,k). Further, H is considered as an $M_R \times M_T$ matrix modeling the MIMO channel. e(n,k) models noise and (inter-cell) interference with covariance matrix $$E\{e(k_1,n_1)e^H(k_2,n_2)\} = \begin{cases} Q, & k_1 = k_2, n_1 = n_2, \\ 0, & \text{otherwise.} \end{cases}$$

By means of appropriate scheduling and space domain link adaptation and encoding it is assumed to be possible to control the interference predictability so that the assumed measurement model holds.

When considering an embodiment where the data element is defined by help of a matrix-valued SINR, this matrix is defined as $\Gamma = H^H Q^{-1} H$.

$\Gamma$ is a Hermitian matrix of size $M_T \times M_T$ with matrix elements $\gamma_{ij}$ that are arranged as follows:

$$\Gamma = \begin{pmatrix} \gamma_{11} & \gamma_{12} & \Lambda & \gamma_{1M_T} \\ \gamma_{12}^* & \gamma_{22} & \Lambda & \gamma_{2M_T} \\ M & & O & M \\ \gamma_{1M_T}^* & \Lambda & & \gamma_{M_T M_T} \end{pmatrix}$$

The elements on the diagonal may be written as $$\gamma_{ii} = h_i^H Q^{-1} h_i, i=1,\ldots,M_T,$$

where $h_i$ is the $i^{th}$ column of H, i.e. the channels between transmit antenna i and all the receive antennas. These elements $\gamma_{ii}$ can be interpreted differently depending on the receiver unit: According to a first interpretation possibility, the values correspond to the signal-to-noise ratio (SNR) after receiver combining with optimum combining of noise and intercell interference when the "intra-cell" interference from the other transmit antennas is neglected.

According to another interpretation possibility, the values correspond to the "SNR" for so called maximum ratio combining that is the sum of SNRs of the individual receive antennas in case that the noise and interference is, at least, assumed to be approximately uncorrelated so that Q is diagonal. Finally, in case of a single receive antenna, the values may be recognized as, for instance, a more conventional "SNR", i.e the magnitude of the channel tap squared divided by the noise and interference power.

The complex valued off-diagonal element may be written as $$\gamma_{ij} = h_i^H Q^{-1} h_j = \left(Q^{-\frac{1}{2}} h_i\right)^H \left(Q^{-\frac{1}{2}} h_j\right).$$

These values may be viewed as the inner products of channels that are whitened with respect to interference and noise and that are associated with transmit antennas i and j whereby the inner product can be interpreted as a spatial orthogonality measure or an instantaneous spatial correlation measure between an antenna pair i and j. Another way is to write the off-diagonal element as $\gamma_{ij} = \sqrt{\gamma_{ii}}\sqrt{\gamma_{jj}}c_{ij}$, where $c_{ij}$ represent complex-valued "cosine of an angle/correlation coefficients" with magnitude less than or equal to one.

The matrix-valued $\Gamma$ as defined above contains both the SINRs of the individual transmit antennas (or "lengths/weighted norms") as well as correlation measures ("cosine of angles") between the transmit antennas. An interpretation is that all that is needed to determine performance for some linear excitation, e.g. with beam forming weights, is the norms of the vectors and the angles between them.

According to one conceivable embodiment of the present invention, a data element provided to the transmitter unit contains the entire content of the matrix $\Gamma$ as defined above. However, in preferred embodiments the different allocations and parameters are assessed by mapping the values of $\Gamma$ of different resource elements with modulation and receiver type specific mappings to scalar information measures which in turn are summed over the allocation and used to determine the error probability. Depending on processing and feedback constraints, other conceivable embodiments can relate to, e.g., quantised low-rank factors of the SINRs that are signaled to the transmitter or to embodiments where all the processing is done entirely in the receiver and only the parameters of the preferred allocations are fed back to the transmitter. The following defines several alternatives for performing such a mapping:

1. For spatial multiplexing with bit-interleaved coded modulation (BICM-SM), it is possible to apply approximate non-linear maximum likelihood demodulators. Link quality models based on the mutual information r accumulated over the resource allocation can then be used to predict the error rate after channel coding for BICM-SM given that the MIMO BICM mutual information is used. It is worth noting that the mutual information is a function of $\Gamma$ for the case W=I and thus of $W^H \Gamma W$ in the general case. From this it follows that the accumulated mutual information for a certain allocation of resource blocks (rb) can be written as $$r = \sum_{(rb)} I_X(W^H \Gamma_{rb} W),$$

For simplicity in order to ease the notation it is assumed that the same transmit weights and same modulations are used for all resource blocks. X represents the modulation alphabets of all the transmit antennas and the function $I_X(\bullet)$ is defined as $$I_X(\Gamma) = L - \frac{1}{2^L} \sum_{l=1}^{L} \sum_{x \in X} E \left\{ \log_2 \left( 1 + \frac{\sum_{z \in X: B_l(z) = 1 - B_l(x)} e^{2\mathrm{Real}\{v^H(x-z)\} - (x-z)^H \Gamma (x-z)}}{\sum_{z \in X: B_l(z) = 1 - B_l(x)} e^{2\mathrm{Real}\{v^H(x-z)\} - (x-z)^H \Gamma (x-z)}} \right) \right\}.$$

X is the set of all $2^L$ possible vector valued symbols, $B_l(x)$ equals the value of bit l of a vector symbol x and the expectation is evaluated with respect to the zero mean complex Gaussian vector v which has covariance $\Gamma$. Thus, $I(\Gamma)$ is the mutual information for bit-interleaved coded modulation (BICM) with equiprobable and independent input modulated bits for the channel H with additive Gaussian noise and interference with zero mean and covariance Q. The sum is taken over the appropriate resource blocks and may be mapped very accurately to a block error probability after channel coding.

2. Bit-interleaved coded modulation (BICM-SM) with non-iterative processing has an inherent performance penalty as compared to, e.g., PARC. This motivates the study of BICM-SM with iterative receiver processing. In this case, it is expected that the coded modulation capacity, or the constellation constrained mutual information, is applicable and will be a function of $\Gamma$, or more specifically of $W^H \Gamma W$. A possible mapping function is in this case the constellation constrained mutual information for coded modulation.

3. For cases where Gaussian modulation is a reasonable approximation, the mutual information may be written as $$I_{Gaussian} = \log_2|Q + HWW_H H^H| - \log_2|Q| = \log_2|I + W^H \Gamma W|$$

Apparently, knowledge of $\Gamma$ is already sufficient for a so called singular value decomposition (SVD) based closed loop MIMO, which takes the solution for Gaussian modulation as starting point.

4. For linear MMSE receivers, linear processing is first used to separate different streams which then are demodulated separately. In this case it is (mainly) the SINR after receiver processing that determines performance. The scalar SINR may then be mapped to a modulation specific mutual information. Now, for MMSE combining/equalization, the linear combining weights are $$V = (HWW^H H^H + Q)^{-1} HW.$$

Using the matrix inversion lemma, one may show that the signals after the combiner/equalizer may be written as $$\hat{s}(n,k) = V^H y(n,k) = (I + W^H \Gamma W)^{-1} W^H \Gamma W s(n,k) + \tilde{e}(n,k),$$

where the covariance of the noise and interference is $$E\{\tilde{e}(n,k)\tilde{e}^H(n,k)\} = (I + W^H \Gamma W)^{-1} W^H \Gamma W (I + W^H \Gamma W)^{-1}.$$

From this it can be seen that the SINR after linear transmitter and receiver processing (with the matrices W and V) may be determined by using $\Gamma$. The mutual information may then in turn be determined for all the streams by mapping the scalar SINRs to mutual information using one-dimensional mappings.

5. For combinations of linear MMSE processing and non-linear successive interference cancellation (SIC) after channel decoding, as employed by (S-)PARC, it may be noted that SINRs of different streams again may be determined from $\Gamma$ assuming successful cancellation. This can be accomplished by setting parts of W corresponding to already cancelled streams to zero.

6. In a multi-user setting with simultaneous transmission to several users in parallel, the impact of "SDMA"-interference may be deduced from the elements of by $\Gamma$. For terminal maximum ratio combining (MRC) and transmission of one stream per terminal directly from the antennas, the SINR for a given terminal is a function of the elements of $\Gamma$. With matrix valued SINRs for several users, multi-user resource allocation may be performed also in the spatial domain as the measure captures the spatial orthogonality between different (linear excitations of) transmit antennas.

7. For so-called linear dispersion codes, e.g. Alamouti's orthogonal diversity design for to antennas as a special case, it has been indicated that for space-only linear receiver processing with (approximately) wide-sense stationary noise, the SINR is determined by the dispersion codes as well as by $\Gamma$. Thus, by measuring $\Gamma$ and considering the equivalent linear real valued model, performance for different dispersion codes may be evaluated so that the best dispersion code can be selected as part of the fast link adaptation.

From the examples described above it becomes apparent that the data element according to the present invention derived from the matrix-valued SINR $\Gamma$, can be used to determine the performance after channel coding. This is valid for any choice of the transmit weights W. Thus, when the data element, e.g. in form of the matrix $\Gamma$ or a processed representation of its elements, and the type of receiver processing and allocation are known, the present invention allows predicting the supported data rate such that the spatial transmission can be optimized not only with respect to weights but also with respect to, e.g., the choice of dispersion code. This means that $\Gamma$ serves the same role as a channel quality information (CQI) and/or channel state information (CSI) do in a 3rd generation communication system in the sense that supported rate and optimization/selection of spatial transmit parameters, such as weights, can be done.

The present invention aims to condense measurements of channel and interference to a defined format as expressed, e.g., in the matrix-valued SINR $\Gamma$ and use it for optimization/selection of transmit parameters, such as allocation of resource blocks to different users, outer channel coding rates, block sizes, as well as resource block parameters such as modulation, transmit weights, and linear dispersion codes.

Figure 1:
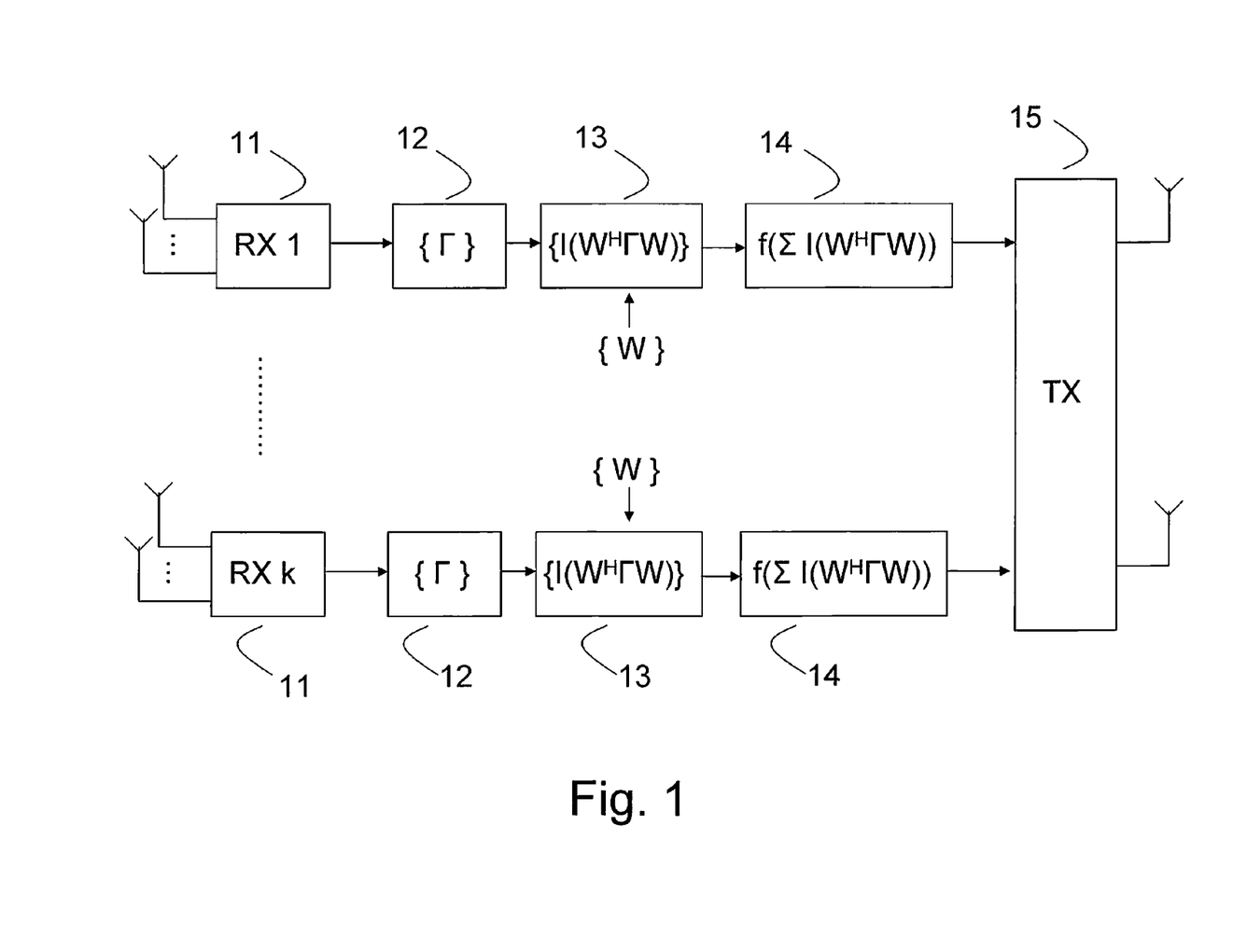
FIG. 1 illustrates the measuring of matrix-valued SINRs for resource elements used to evaluate different allocations and transmit parameter settings to optimise performance, e.g., in terms of delay and throughput.

With reference to FIG. 1, k network units determine the matrix-valued $\Gamma$ in block 12 from the signals that have been received from a second network unit via each of the multiple antenna branches in block 11 for a set of resource blocks. It is envisioned that for a candidate allocation and transmission parameter set, the SINRs of the allocated resource blocks are mapped in block 13 to scalar-valued information measures. These mappings, I(•), depend primarily on the chosen modulation and the kind of receiver processing (linear MMSE, non-linear ML, iterative ML). Performance for different transmit weights W may be assessed by mapping $W^H \Gamma W$ rather than $\Gamma$. The mapping may also depend on interference from streams to other users scheduled in parallel. Whereas I(•) takes scalar valued arguments in the single transmit antenna case or single stream case, the arguments in the general case with multiple transmit antennas can be represented as Hermitian matrices. Next, in block 14, the scalar-valued information measures can be summed and, for a given code rate and code block length, mapped to a block error probability with a code specific function F(•). Several different allocations can then be compared with respect to, e.g., average expected throughput or probability of successful delivery. By taking priorities and delay constraints into account suitable allocation can be made. Processing limitations and feedback constraint may force different functions to be placed in different nodes. There are therefore several embodiments of the invention in a receiver unit for providing information, block 15, e.g. as feedback information to a transmitting unit, on the downlink channel and the interference conditions, whereof the examples below illustrate some of them. The data element is thereby composed out of a processed representation of the elements of said matrix $\Gamma$.

1. A receiver forms the data element for a set of resource blocks and provides for a subset of the resource blocks $\Gamma$, low rank approximations of $\Gamma$ (which may, under mild conditions, be regarded equal to the minimum of the number of transmit and receive antennas), factors of $\Gamma$ (e.g. a Cholesky factor or a matrix square root), or a set of parameters from which $\Gamma$ can be reconstructed. A transmitter then uses the SINR to select appropriate transmit parameters and also performs multi-user optimization.

2. A receiver forms the data element for a set of resource blocks, evaluates quadratic functions of $\Gamma$ corresponding to different transmit weights and then provides the results for the set of said weights. This means that the (effective matrix valued) SINRs for different selections of transmit weights are determined and signaled to the transmitter.

3. A receiver forms the data element for a set of resource blocks and provides for a subset of resource blocks functions such as the trace or whiteness measures such as the ratio between the determinant and the trace of it or the number of significant eigenvalues.

4. A receiver forms the data element for a set of resource blocks, and provides for a subset of resource blocks the appropriate information measure for a subset of evaluated transport formats in terms of transmit weights and modulations. This means that the receiver may recommend modulation, dispersion, and beamforming weights for different resource blocks. The transmitter may then allocate resource blocks to different users and assign appropriate channel coding.

5. A receiver forms the data element for a set of (pre-) allocated resource blocks, evaluates different transmit parameters in terms of transmit weights and modulation by forming the accumulated mutual information r, and then maps r to an error rate after outer channel coding with a mapping which depends on the code itself, its rate and the block length and provides the transmit parameters which optimizes the throughput or the data rate subject to constraints on for example the error probability. In this case, essentially all processing is placed in the terminal.

A second embodiment of the present invention relates to the retrieval of the content of a data element as described above comprising a representation of the elements of the matrix $\Gamma$, in particular for a TDD-based radio access network. In this embodiment, a transmitting unit does not receive feedback information regarding the matrix-valued SINR but is enabled to deduce this information itself by help of the signaling on the transmission channel in the reverse direction. In an FDD system, where uplink and downlink exist on different frequencies, long term properties such as angles, delays and attenuations of different clusters of the radio channel are the same so that the corresponding downlink parameters can be deduced from uplink observations. In a TDD system, where uplink and downlink exist on the same frequency band within the coherence time, short term knowledge of the actual instantaneous channel realization may be deduced form uplink observations. An additional possibility for TDD is to exploit the reciprocity of the radio channel. In both cases, channel estimates are determined either by listening to existing communication, or by inserting special channel sounding mechanisms, such as terminal transmission of antenna specific wideband pilots, from which the base station can estimate the full frequency selective MIMO channel.

The use of reciprocity in TDD for deducing channel information for resource allocation and adaptation may be limited since only the channel is observed. However, as described above, knowledge of the interference is required as well. Thus, it may in practice not be possible to fully exploit the benefits of frequency domain adaptation and multiple antenna transmission, despite the reciprocity of TDD, because there is no feedback of interference characteristics.

The following embodiment relates to a linear pre-coding of the (uplink) transmission with a (space-frequency) whitening filter for the interference (experienced in the terminal). The (base station) receiver may then deduce an estimate of the whitened channel and, by squaring this estimate, determine a performance dictating data element (corresponding to the above defined matrix-valued SINR Γ). This information is in turn used to optimize and select (spatial) transmit parameters as part of the (spatial) link adaptation and scheduling. In a MIMO OFDM TDD setting, with almost negligible feedback, the relevant interference properties may be accounted for when exploiting channel reciprocity to determine channel knowledge for adaptation and multi-user scheduling.

The data model already defined above will also be applied in the following description for both outlining the downlink and uplink conditions. Thus, for the reverse direction samples associated within a resource block k may be modelled as $y_{HS,k} = H'_k x_{MS,k} + e'_k$, whereby $H'_k$ is an $M_{BS} \times M_{MS}$ matrix modeling the uplink channel and the signals transmitted by the mobile station are modelled as $x_{MS,k} = V_k s_{MS,k}$. $s_{MS,k}$ is (for simplicity) an $M_{MS} \times 1$ normalized column vector modeling transmitted pilot and/or data symbols and $V_k$ is an $M_{MS} \times M_{MS}$ pre-coding matrix containing transmit weights.

In a TDD setting with appropriate calibration and signaling within the coherence time of the channel $H'_k = H_k^T$ is valid. This is the key approximation used when exploiting the reciprocity of the channel. The basic problem regarding the interference is that $E\{e'_k e'^H_k\} \neq Q'_k$, even if the number of antennas were the same. Thus, even though the sample models above may be used to deduce the downlink channel by measurements on the uplink channel, the same can not be done immediately for the interference.

As described above, the data element, derived by the matrix-valued SINR, is to be formed in the transmitter from estimates of the MIMO channel and the impairment covariance matrix, and this matrix-valued SINR, which coincides with the conventional SINR in the single antenna case, is indeed a performance dictating measure which can be used for transmit parameter optimization and performance prediction. The present invention aims at making the same SINR available to the transmitter. Thus, if the data element, e.g. the matrix-valued SINR, is made available at the transmitter, essentially all relevant transmit parameters can be optimized and performance after channel decoding can be predicted for large class of receivers.

The pre-coding $V_k$ defined above (with reference to the selected data model) is chosen so that a factor of the performance dictating SINR $\Gamma_k$ can be determined within a scaling. This additional scaling, which either may apply to each carrier separately or to all carriers, may be provided to the base station to be used for resolving the scaling ambiguity.

For the purpose of illustration, it is assumed that the terminal during an uplink transmission employs a pre-coding matrix. The base station may then estimate the channel, for example by assuming that all or a sufficient fraction of the symbols are known pilot symbols. When neglecting noise the channel estimate associated with resource block k is then $\hat{H}_k = H'_k V_k$. For the reciprocal TDD case, the base station then forms $$G_k = (\hat{H}_k \hat{H}_k^H)^C = H_k^H (V_k V_k^H)^C H_k.$$

If the pre-coding is selected as a whitening filter in the sense that $(V_k V_k^H)^C = q_k Q_k^{-1}$ for a scalar scaling $q_k$ it is apparent that $G_k = q_k \Gamma_k$, from which transmit parameters and downlink performance can be predicted.

It should be observed that the whitening filter may be determined in several ways. One possibility is to exploit the Hermitian structure of the covariance matrix and determine it with a Cholesky factorization. Further, one can use either a single common scaling for all carriers k or one scaling per sub-carrier.

The scaling $q_k$ may be signaled directly; however, it appears more attractive for the terminal to assess a scalar-valued function of the matrix-valued SINR, such as the trace of the matrix-valued SINR or any matrix norm, combined with averaging this scalar function over resource blocks for the case that a single common scaling is used. The trace may be interpreted as a sum of individual transmit antennas SINRs over antennas and resource blocks. In the single antenna case with some common scaling, i.e. $q_k = q$ and with $\sigma_k^2$ being the interference noise of resource block k, the pre-coding is reduced to setting the relative transmit amplitude of resource block k to $q/\sigma_k$. The squared channel estimate of the carrier will then be the actual SINR scaled. The scaling can be resolved by help of a report on the SINR averaged over all resource blocks. The precoding may thus be used to help the base station to determine the relative relations between different antennas and different frequencies whereas the reported scaling make it possible for the base station to determine the absolute values of the SINR in the terminal.

When assuming that a terminal determines the average for K resource blocks (or subcarriers) of the trace of the matrix-valued SINR and signals $$\frac{1}{K} \sum_{k=1}^{K} Tr\{\Gamma_k\}$$

back it follows directly from the relation $G_k = q\Gamma_k$ that the base station can determine the common scaling q as $$q = \frac{\frac{1}{K} \sum_{k=1}^{K} Tr\{G_k\}}{\frac{1}{K} \sum_{k=1}^{K} Tr\{\Gamma_k\}}.$$

Even though the previous section has been described with regard to a TDD-based communication system it is clear that the idea can also be applied to a long-term FDD setting with a pre-whitening filter based on long-term averaging of interference and matrix-valued SINRs.

The following outlines a possible implementation: In a first step, the terminal forms estimates of the interference covariance matrix. This can be done using reference symbols broadcasted for measurements in the cell during a downlink time slot in which the base station transmits. The terminal may also form estimates of the MIMO channels and determine the scaling in terms of the trace of the matrix-valued SINRs. Then, the terminal processes the interference measurements and determines the pre-coding matrices. In the next time slot, the terminal transmits either a mix of data and pilot symbols or essentially only the pilot symbols for the case with channel sounding. Linearly independent pilot patterns with the deduced pre-coding matrix are transmitted. The scaling feedback may be embedded, e.g., as unknown data during the uplink transmission. The base station receives the signal and estimates the pre-whitened channels of the resource blocks, for instance by using knowledge of the pilot patterns. Decoding of scaling feedback settles the unknown scaling and the base station may form the data element, to be used to optimize and tune downlink transmission.

Figure 2:
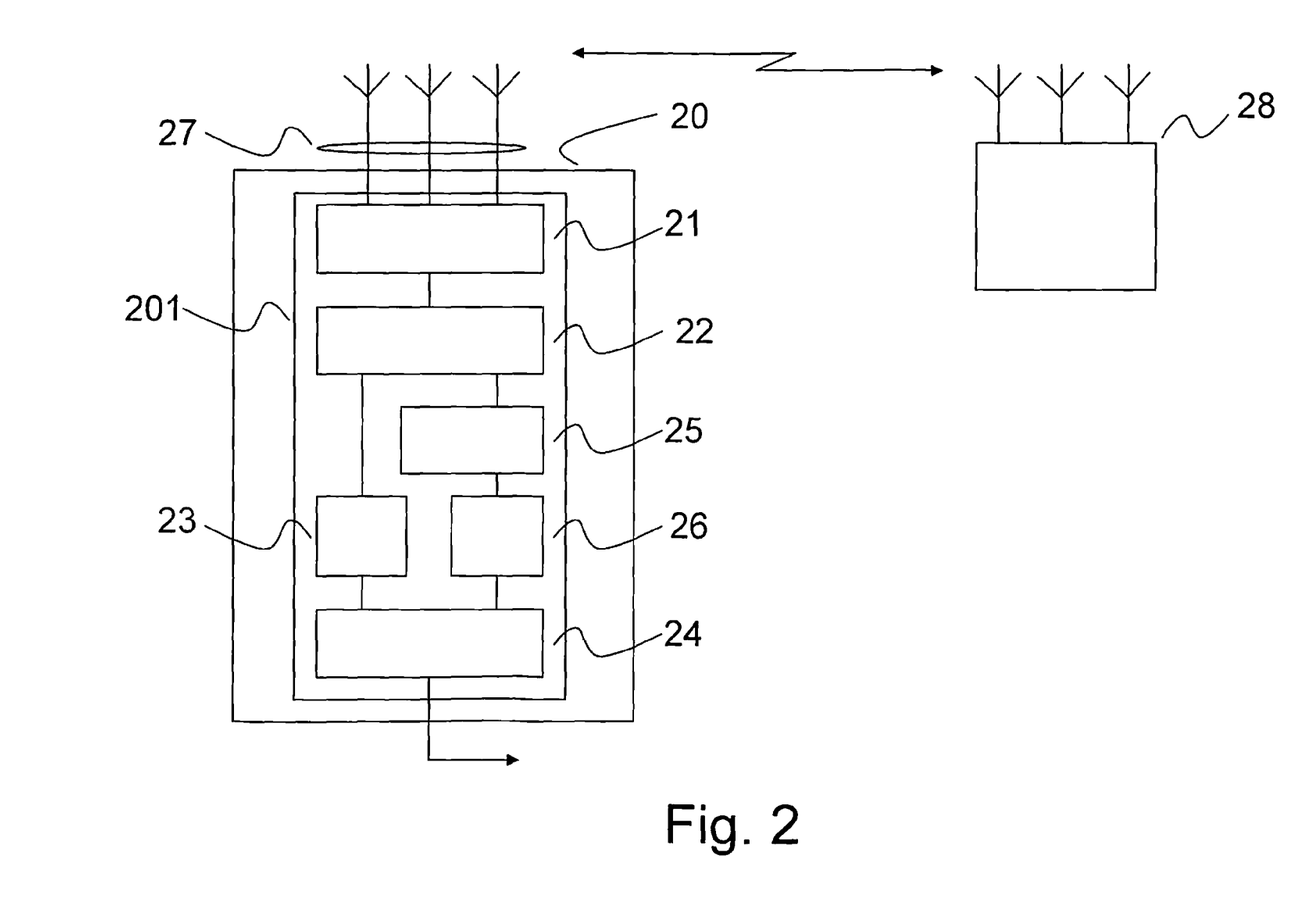
FIG. 2 illustrates the arrangement for performing the first embodiment of the present invention.

FIG. 2 discloses an arrangement (201) in a first network unit (20) of a wireless communication system, said unit (20) comprising one or multiple antennas (27) adapted for data transmission to and data reception from at least one second network unit (28) in said system. The arrangement further comprises means (22) for determining values equivalent to the Hermitian inner products between whitened vector channels associated with the individual combinations of antennas of said second network unit (28) transmitting to said first network unit (20). The arrangement further comprises means (23) for mapping said determined values into a data element and means (24) for providing said data element as feedback information to said second network unit (28). According to particular embodiments, the arrangement further comprises means (25) for achieving a processed representation of a Hermitian matrix that is composed of said determined values and means (26) for mapping said processed representation into a data element.

Figure 3:
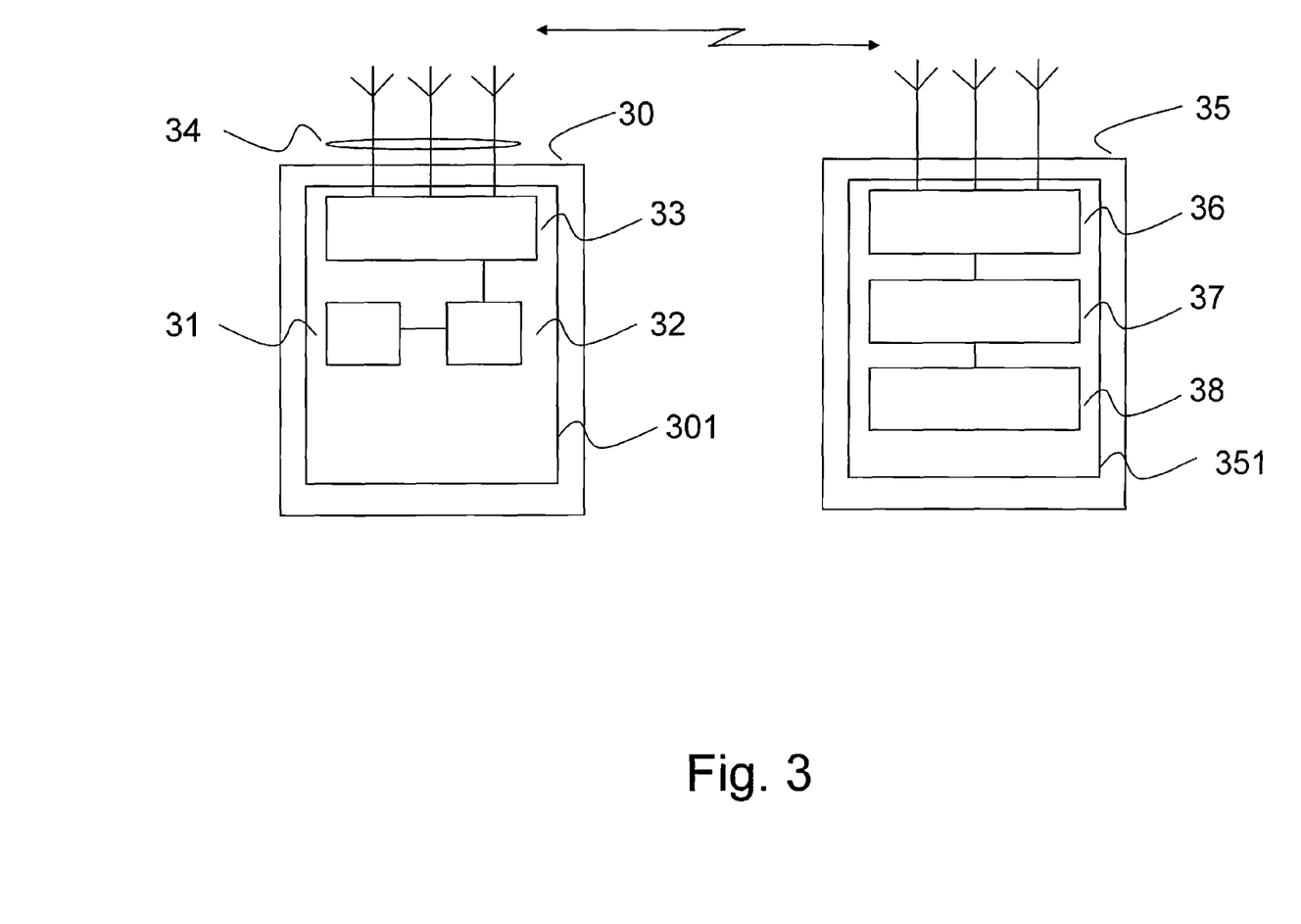
FIG. 3 illustrates the arrangements for performing the second embodiment of the present invention.

FIG. 3 discloses an arrangement (301) in a first network unit (30) of a wireless communication system, said unit (30) comprising one or multiple antennas (34) adapted for data transmission to and data reception from at least one second network unit (35) in said system. The first network unit further comprises a signal generator (31) for generating a known signal sequences, and a whitening filter (32) applying a precoding matrix corresponding to the experienced interference at the side of the first network unit (30) when transmitting said signal sequences. The first network unit further comprises a transmitter (33) for transmitting said signal sequences such as to provide to the second network unit (35) an estimate of the effective channel carrying said precoded signal sequence for determining values equivalent to the Hermitian inner products between whitened vector channels associated with the individual combinations of antennas of said second network unit (35) transmitting to said first network unit (30).

FIG. 3 further discloses an arrangement (351) in a second network unit (35) in a wireless communication system. The second network unit (35) comprises one or multiple antennas adapted for data transmission to and data reception from the at least one first network unit (30). The second network unit comprises processing means (36) for processing received known signal sequences from said first network unit (30) transmitted with a precoding chosen as a whitening filter corresponding to the experienced interference at the side of the first network unit (30). The second network unit further comprises means (37) for deducing an estimate of the effective channel carrying said precoded signal sequences for determining values equivalent to the Hermitian inner products between whitened vector channels associated to the individual combinations of antennas of said second network unit (35) transmitting to said first network unit (30). The second network unit further comprises means (38) for determining from said values a set of transmit parameters including at transmission weights, modulation and coding parameters, for data transmission on the reverse transmission channel.

The invention claimed is:

1. A method for link adaptation in a first network unit of a wireless communication system, said first network unit comprising one or multiple antennas adapted for data transmission to and data reception from at least one second network unit in said system, said method adapting, in response to interference experienced at the site of the first network unit, transmission parameters for data transmissions from said second network unit to said first network unit, said method comprising the steps of:
 determining values equivalent to Hermitian inner products between whitened vector channels associated with individual combinations of antennas of said second network unit transmitting to said first network unit;
 mapping the determined values into a data element; and,
 providing the data element as feedback information to said second network unit.

2. The method according to claim 1, wherein the steps of determining the values and mapping the determined values are done for at least a set of one or more resource blocks and the mapping implies a mapping of a processed representation of a Hermitian matrix that is composed of said determined values associated with a resource block.

3. The method according to claim 2, wherein said processed representation is derived from a low rank approximation or a determining factor of said Hermitian matrix.

4. The method according to claim 2, wherein said processed representation is derived from a quadratic function of said Hermitian matrix.

5. The method according to claim 2, wherein said processed representation is derived from significant eigenvalues of said Hermitian matrix or a function thereof.

6. The method according to claim 2, wherein said processed representation represents the appropriate information content of said determined values for a subset of evaluated transport formats in terms of transmit weights and modulations.

7. The method according to claim 6, wherein the appropriate information content is a function of said Hermitian matrix describing multiple input multiple output (MIMO) bit-interleaved coded modulation (BICM) or constellation constrained mutual information.

8. The method according to claim 6, wherein the appropriate information content is a function of said Hermitian matrix describing BICM mutual information as a function of the equivalent post-receiver transmit and receive processing effective single input single output (SISO) channels.

9. The method according to claim 8, wherein the BICM mutual information is summed over a set of resource blocks.

10. The method according to claim 9, wherein the resource blocks are evaluated and selected such as to maximize the summed mutual information for the selected resource blocks.

11. The method according to claim 2 wherein said processed representation is derived by the steps of:
 forming accumulated mutual information for an allocation in terms of said set of one or more resource block;
 mapping the accumulated mutual information to an error rate from which performance is determined; and,
 providing transmit parameters that optimize transmission.

12. An arrangement for link adaptation in a first network unit of a wireless communication system, said first network unit comprising one or multiple antennas adapted for data transmission to and data reception from at least one second network unit in said system, said arrangement comprising:
 processing circuitry configured for determining values equivalent to Hermitian inner products between whitened vector channels associated with individual combinations of antennas of said second network unit transmitting to said first network unit;
 the processing circuitry further configured for mapping said determined values into a data element; and,
 the processing circuitry further configured for providing said data element as feedback information to said second network unit.

13. The arrangement according to claim 12, wherein the processing circuitry is further configured for achieving a processed representation of a Hermitian matrix that is composed of said determined values and wherein the processing circuitry is further configured for mapping said processed representation into a data element.

14. The arrangement according to claim 12, wherein the arrangement is implemented in a user equipment and whereby said second network unit is a radio base station.

15. A method for link adaptation in a first network unit of a wireless communication system, said first network unit comprising one or multiple antennas adapted for data transmission to and data reception from at least one second network unit in said system, said method adapting, in response to a channel and interference experienced at the site of the first network unit, transmission parameters for data transmissions from said second network unit to said first network unit, said method comprising the steps of
- processing known signal sequences by applying a precoding matrix chosen as a whitening filter corresponding to the experienced interference at the site of the first network unit such as to provide to the second network unit an estimate of an effective channel carrying said precoded signal sequences for determining values equivalent to Hermitian inner products between whitened vector channels associated to individual antenna combinations of antennas of said second network unit transmitting to said first network unit; and,
- transmitting said processed signal sequences to the second network unit.

16. The method according to claim 15, wherein the precoding matrix is scaled with a scalar to control transmission power.

17. The method according to claim 16, wherein scaling is transmitted to the second network unit as feedback information.

18. The method according to claim 15, wherein the wireless communication system comprises an Orthogonal frequency-division multiplexing (OFDM)-based radio access network and said processing is done for one or several resource blocks corresponding to groups of one or several adjacent sub carriers.

19. The method according to claim 18, wherein precoding matrices of the resource blocks are scaled with a common scalar to control transmission power.

20. An arrangement for link adaptation in a first network unit of a wireless communication system, said first network unit comprising one or multiple antennas adapted for data transmission to and data reception from at least one second network unit in said system, said arrangement comprising:
- a signal generator for generating known signal sequences;
- a whitening filter for applying a precoding matrix corresponding to interference experienced at the site of the first network unit when transmitting said known signal sequences; and,
- a transmitter for transmitting said known signal sequences such as to provide to the second network unit an estimate of an effective channel carrying a precoded signal sequence for determining values equivalent to Hermitian inner products between whitened vector channels associated with individual combinations of antennas of said second network unit transmitting to said first network unit.

21. The arrangement according to claim 20, wherein the communication system comprises a Orthogonal frequency-division multiplexing (OFDM)-based radio access network and said whitening filter applies a precoding matrix for one or several resource blocks corresponding to groups of one or several adjacent sub carriers.

22. The arrangement according to claim 20, wherein said first network unit is a user equipment and said second network units is a radio base station, both units equipped for data transmission and reception over a Time Division Duple (TDD)-based radio access network.

23. A method for link adaptation in a second network unit of a wireless communication system, said second network unit comprising one or multiple antennas adapted for data transmission to and data reception from at least a first network unit, said method adapting, in response to interference experienced at the site of the first network unit, transmission parameters for data transmissions from said second network unit to said first network unit, said method comprising the steps of:
- receiving a known signal sequence from said first network unit transmitted with a precoding chosen as a whitening filter corresponding to the experienced interference at the site of said first network unit;
- deducing an estimate of an effective channel carrying a precoded signal sequence for determining values equivalent to Hermitian inner products between whitened vector channels associated with individual combinations of antennas of said second network unit transmitting to said first network unit; and,
- determining from said values a set of transmit parameters including transmission weights, modulation and coding parameters, for data transmission on a reverse transmission channel.

24. The method according to claim 23, wherein the communication system comprises a Orthogonal frequency-division multiplexing (OFDM)-based radio access network and wherein precoding is done for one or several resource blocks corresponding to groups of one or several adjacent sub carriers such as to deduce estimates for each of said one or several resource blocks.

25. The method according to claim 23, wherein the absolute scaling of a Hermitian matrix that is composed of said determined values is deduced by help of a scalar function of said Hermitian matrix.

26. The method according to claim 23, wherein the transmit parameters are selected to maximize throughput.

27. An arrangement for link adaptation in a second network unit in a wireless communication system, said second network unit comprising one or multiple antennas adapted for data transmission to and data reception from at least a first network unit, said arrangement comprising:
- processing circuitry configured for processing received known signal sequences from said first network unit transmitted with a precoding chosen as a whitening filter corresponding to interference experienced at the site of the first network unit;
- the processing circuitry further configured for deducing an estimate of an effective channel carrying said processed received known signal sequences for determining values equivalent to Hermitian inner products between whitened vector channels associated to individual combinations of antennas of said second network unit transmitting to said first network unit; and,
- the processing circuitry further configured for determining from said values a set of transmit parameters including transmission weights, modulation and coding parameters, for data transmission on a reverse transmission channel.

28. The arrangement according to claim 27, wherein said first network unit is a user equipment and said second network unit is a radio base station, both units equipped for data transmission and reception over a Time Division Duple (TDD)-based radio access network.

29. The arrangement according to claim 27, wherein said first network unit is a radio base station and said second network unit is a user equipment, both units equipped for data transmission and reception over a Time Division Duple (TDD)-based radio access network.

30. The arrangement according to claim 27, wherein the communication system comprises an Orthogonal frequency-division multiplexing (OFDM)-based radio access network.

* * * * *